United States Patent [19]

Mohr

[11] 4,281,895
[45] Aug. 4, 1981

[54] QUICK CHANGE LENS MOUNT

[75] Inventor: Siegfried H. Mohr, Santa Clara, Calif.

[73] Assignee: Quantor Corporation, Mountain View, Calif.

[21] Appl. No.: 29,506

[22] Filed: Apr. 12, 1979

[51] Int. Cl.³ .................. G02B 7/02; G02B 7/14; F16L 37/24; F16B 7/20
[52] U.S. Cl. .................................. 350/257; 285/401; 403/348
[58] Field of Search ............................. 350/251–254, 350/256–257; 354/286; 285/396, 361, 401–402, 360, 394; 403/348, 343, 349

[56] References Cited

U.S. PATENT DOCUMENTS

| 757,712 | 4/1904 | Arnold | 403/348 |
|---|---|---|---|
| 2,496,928 | 2/1950 | Bing et al. | 350/252 |
| 2,652,828 | 9/1953 | Matheson | 285/360 |
| 3,429,606 | 2/1969 | Brasseur | 403/348 |

FOREIGN PATENT DOCUMENTS 488665  7/1938  United Kingdom ............... 350/257

Primary Examiner—William H. Punter
Attorney, Agent, or Firm—J. T. Cavender; Wilbert Hawk, Jr.; George J. Muckenthaler

[57] ABSTRACT

A mounting for an objective or projection-type lens has a male bayonet with beveled lugs engageable with a recess in a female bayonet plate and a one-piece spring is attached to the female plate and applies clamping force against the lugs of the male bayonet and also against the recessed shoulders of the female plate to provide for rapid changing of the lens and to maintain the lens in precise focal position.

4 Claims, 5 Drawing Figures

QUICK CHANGE LENS MOUNT

BACKGROUND OF THE INVENTION

In the field of optical systems wherein a lens is utilized for magnifying certain information, it is important that the lens is positioned and maintained in such position to provide proper focusing for reading the information. In the case of a projection-type lens, it is advisable to use a high-efficiency lamp along with a high-resolution lens to obtain optimum operating conditions.

Since proper focusing of the optical system is extremely important, various ways and means have been utilized for moving the lens along the axial direction in relation to an optical plane. One well-known method is to adjust the position of the lens along its optical axis by camming means which includes structure whereby the lens and the barrel are axially moved in relation to the optical or focal plane. Another method may use bevel surfaces in the nature of a helical curve whereby a pin or like member is caused to be moved along the curve for adjusting the lens in a manner to provide proper focusing thereof. In a number of these systems it is usually required to refocus the lens system upon reading of different information on microfilm or the like when such film is caused to be replaced in film viewing apparatus.

Additionally, an optical lens may be positioned and retained in a system which includes structure for securing the lens in a manner to avoid repeated re-focusing of the lens and such structure may be designed to make fast and simple changing of the lens which is then in the apparatus for a lens of a different magnification. Lens mounting systems have included bayonet-type structure but also use intricate machining to obtain a "spring effect" to hold a lens against a defined surface, as in the case of many of the lens mountings for cameras.

In the case of a viewer or reader for accommodating microfilm or microfiche it is well-known that the reduction ratio of such microform readers may vary, for example, from 24 to 150 times and also the ratio of the microfilm may vary. Because of these variations, it becomes advisable to have available a number of lenses of different magnification values rather than a plurality of readers with different reduction ratios.

The use of different magnification lenses in a specific reader or like apparatus presents a problem of maintaining focus when the lenses are interchanged to accommodate a microform or microfilm of like ratio. Additionally, it becomes necessary to provide structure which enables changing or replacing lenses in the shortest possible time.

Representative prior art of lens mounting includes U.S. Pat. No. 2,285,768, issued to A. Drucker on June 9, 1942, which discloses a lens mounting wherein a resilient element engages and holds an annular member against a friction-creating ball member and also engages and rests against a shoulder of a distal sleeve. In another form of the lens mounting, a resilient member engages one end of a sleeve to hold the sleeve against the end of a second sleeve.

U.S. Pat. No. 2,469,781 issued to J. M. Peters on May 10, 1949 discloses a lens holder and support which enables rapid changing of lenses and includes a threaded annular rib engaged by a barrel member, a lens assembly provided with a diaphram-changing ring and a flared skirt member secured to the ring.

U.S. Pat. No. 2,691,322 issued to O. Wittel on Oct. 12, 1954 shows a lens-mounting device with an inner ring and an outer ring along with a yieldable connecting member formed of resilient material and having a planar portion and an inclined or dished portion engaging the rings in a manner to retain the surfaces of the rings in engagement and to position the lens mount in axial direction.

U.S. Pat. No. 3,477,777 issued to A. Grosjean on Nov. 11, 1969 discloses a locking device for an adjustable optical element and includes an annular disc which clamps an adjusting ring against a wedge surface.

SUMMARY OF THE INVENTION

The present invention relates to computer output microfilm systems and more particularly to a mounting for a projection lens or the like providing for a quick change lens mounting used with lenses of different magnification. The mounting employs structure which facilitates rapid changing of lenses and provides support levels which retain and maintain a continuity of position for the several lenses so as to be in proper focus when a lens is changed or replaced.

The structure of the present invention includes a supporting barrel in the shape of a male set bayonet for the lens with such bayonet having a plurality of lugs on the periphery at one end thereof, a female bayonet plate which has a recess therein and a plurality of shoulders for engagement by the lugs of the male bayonet. A one-piece planar spring is secured to one side of the female bayonet plate and applies clamping force against the lugs on the male set bayonet which lugs are in turn urged or biased against the recessed shoulders of the female plate.

The fit of the parts provides for an interference between the male bayonet lug and the one-piece spring, and the female bayonet part is provided with a stop pin secured to one of the recessed shoulders in a manner to provide a positive stop after the male bayonet part has been positively and fully engaged in an angular direction and against the stop pin.

The single piece spring member may be utilized in one application thereof to bias or urge the male bayonet in one direction, and may be used in another application to bias or urge the male bayonet in the opposite direction.

In view of the above discussion, the principal object of the present invention is to provide a simple and low-cost method for enabling quick or rapid changing of lenses.

An additional object of the present invention is to provide a single piece resilient element for urging or biasing the lens-supporting structure in one direction.

Another object of the present invention is to provide a single piece resilient element secured to a supporting member and applicable for urging or biasing a lens in one direction in one mode or in the opposite direction in another mode.

Still a further object of the present invention is to provide a lens bayonet with lugs thereon and engageable with a single piece resilient element in a controlled amount of interference therebetween to maintain the lens in the same position upon successive changing or replacement of the lens.

Additional advantages and features of the present invention will become apparent and fully understood from a reading of the following description taken with the annexed drawing.

DETAILED DESCRIPTION OF THE INVENTION

Figure 2:
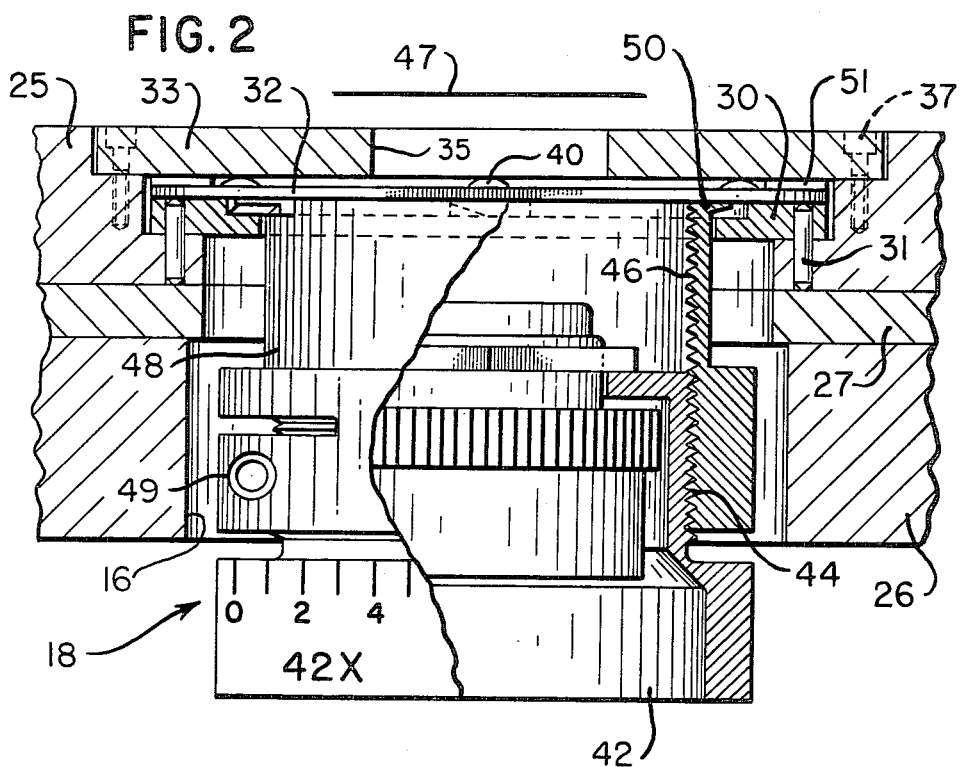
FIG. 2 is an enlarged side view showing one form of the lens assembly.
Figure 1:
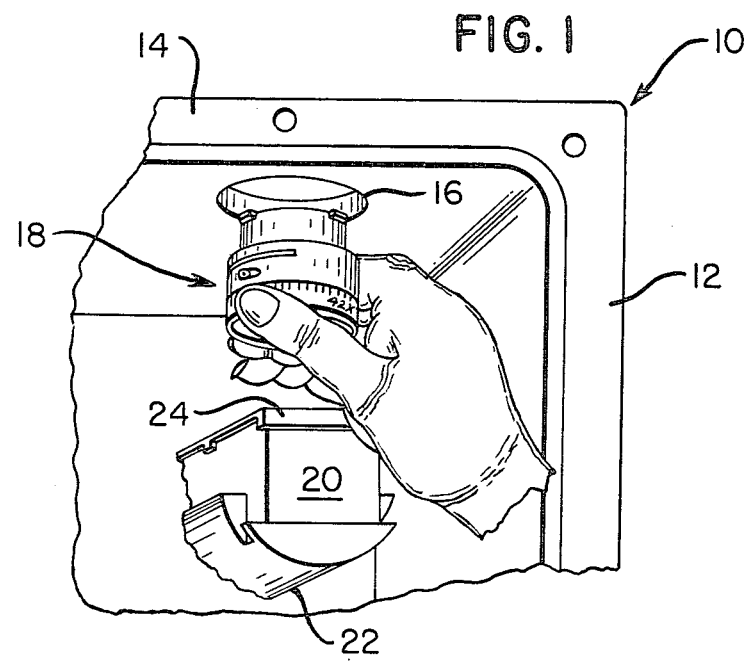
FIG. 1 is a perspective view of a lens being changed in appropriate microform handling apparatus.
Figure 3:
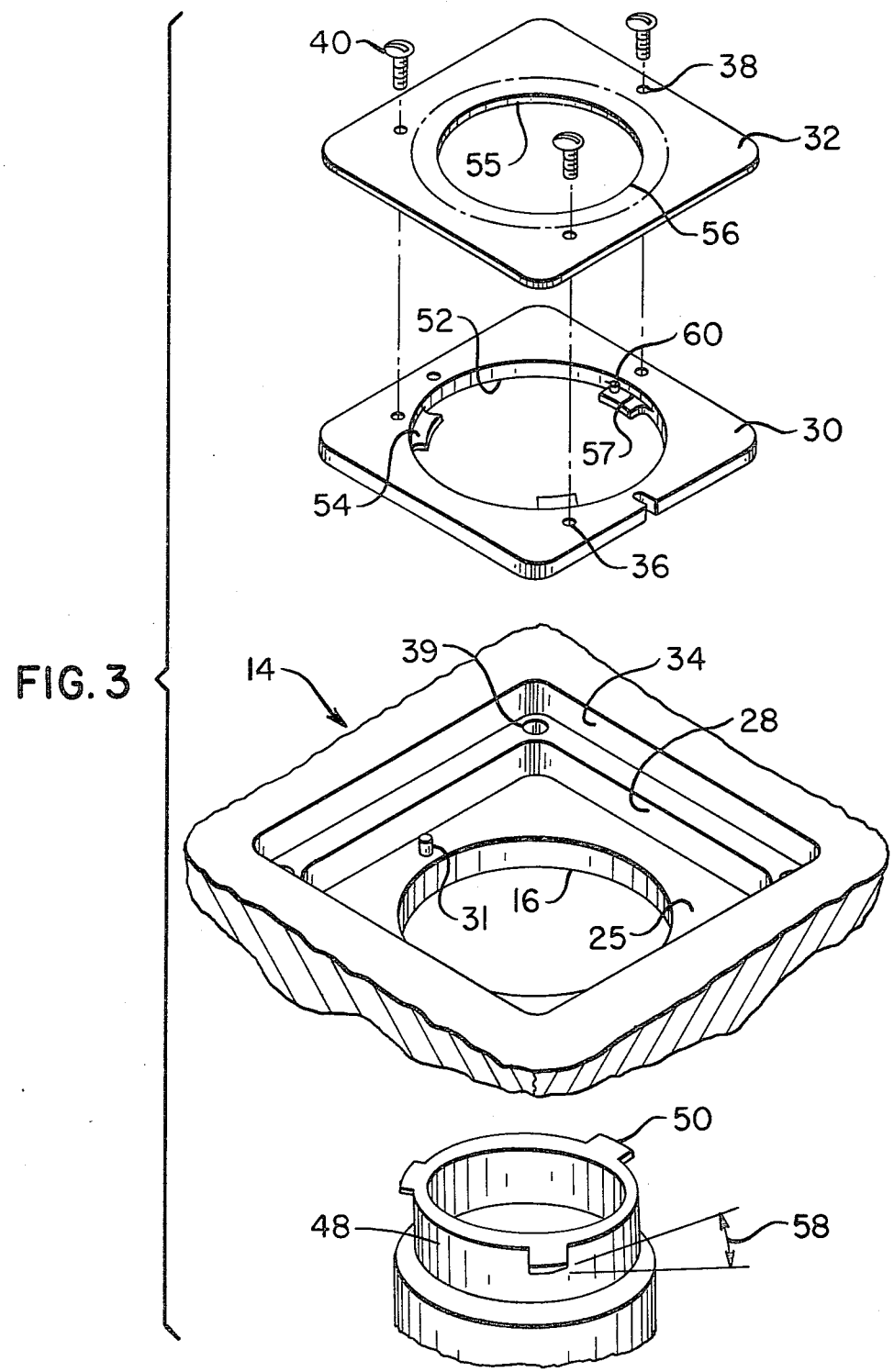
FIG. 3 is an exploded view showing the several parts for supporting the lens.

Referring to FIGS. 1, 2 and 3 of the drawing, a frame member 10 is provided with a side portion 12 and a top portion 14, the top portion having an opening 16 therein for receiving a lens assembly 18 shown in position to be installed in the top portion of a reference member or plate 25 for subsequent operation. A lens cube 20 is supported from a cradle 22 and is provided with a protective cover 24.

An enlarged view of the several parts of the lens mount shown in the exploded view in FIG. 3 includes the top portion 14 of the reference member 25 and the aperture 16 in a plate portion 26 (FIG. 2). The plate portion 26 is formed adjacent a base plate 27 and the reference member 25 to provide a recess 28 (FIG. 3) for receipt of a female bayonet plate 30 and a clamping member or spring 32. Tapped holes 36 are provided in the bayonet plate 30 and also apertures 38 in the clamping spring 32 for receipt of screws 40 to secure the spring 32 to the bayonet plate 30. The plate 30 is positioned in abutting manner with the central portion 34 of the reference member 25. A pin 31 is provided in the plate 25 on opposite sides of the aperture 16 to match a hole and a slot in the plate 30. A cover plate 33 with an opening 35 therein is secured by screws 37 in tapped holes 39 of the reference plate 25.

The lens assembly 18 comprises a lens holder 42 (FIG. 2) adapted to enclose and retain a particular lens of a stated magnification (42×) and has threads 44 on a peripheral portion thereof for engaging with threads 46 on an interior diameter of a male set bayonet 48. The male bayonet 48 is bevel-shaped and is provided with screw means 49 or the like for tightening adjacent portions thereof so as to precisely position and retain the lens holder 42 in relation to the bayonet 48. In this manner, the lens is set for proper focus relative to a microimage plane 47 above the lens assembly 18 and, when the critical focus is established and set, the focus condition will remain until the lens is removed from the holder 42.

The male bayonet 48 has three lugs or tabs 50 (FIG. 3) at the upper end thereof, equally spaced and extending outwardly to engage with the female bayonet plate 30 and against the clamping spring 32. The bayonet plate 30 is seated in the recess 28 of the stepped plate portion of reference member 25 and, with the spring 32 secured to the plate 30 and retained by the cover plate 33, the lugs or tabs 50 are held in place by the respective planar surfaces of the several parts. The cover plate 33 has four gaskets or pads 51 to provide clearance for the screws 40 and also to enable adjustment at the several corners of the plate 33. The diameter of the aperture 16 in the plate portion 26 and the diameter of the aperture 52 in the bayonet plate 30 enable the male bayonet 48 with its lugs 50 to pass through the apertures with the apertures having clearance diameters.

The plate 30 includes lugs or tabs 54 and the spring 32 includes a central aperture 55 having a diameter approximately the diameter of the internal threaded portion of the male bayonet 48 so as to provide a seat for the lugs or tabs 50 of the male bayonet 48 within the space or cavity between the plate lugs 54 and an interior portion 56 adjacent the aperture 55 of the spring 32, and defined by the offset 57 of the lugs 54 from the upper surface of the plate 30. Each of the male bayonet lugs 50 has an inclined or slanted surface of fifteen degrees, as shown by the arrow 58, on the underside at one edge of each lug so as to enable ease of engagement in the cavity between the lugs 54 and the portion 56 of spring 32 when the lens assembly 18 is being installed by turning in a clockwise direction as seen in FIG. 1. One of the lugs 54 of the plate 30 has a stop pin 60 for limiting the extent of travel of the male bayonet 48.

Figure 4:
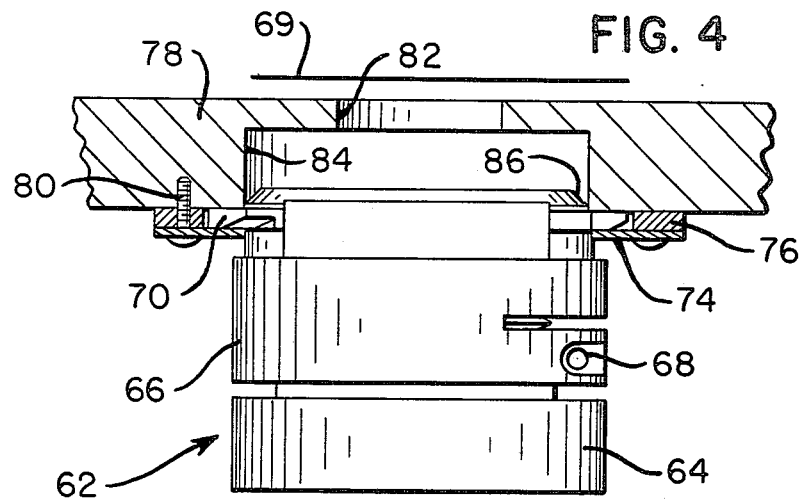
FIG. 4 is a side view showing another form of the lens assembly.
Figure 5:
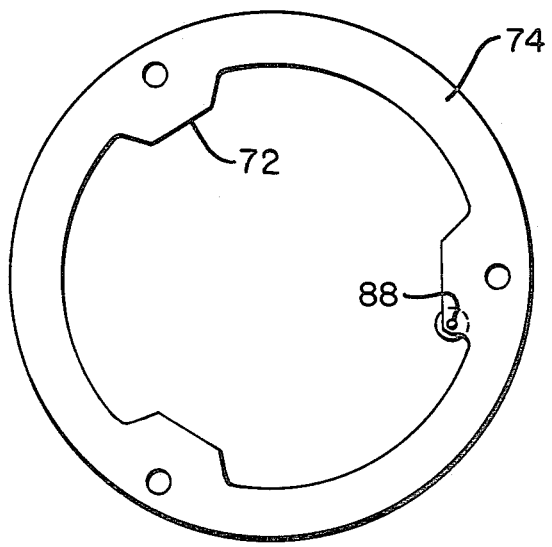
FIG. 5 is a detail view of the spring shown in FIG. 4.

FIG. 4 shows another form of the lens mount wherein a lens assembly 62 includes a lens holder 64 adapted to enclose and retain a particular lens (not shown) for a stated magnification and has threads on a peripheral portion for engaging with threads on an interior diameter of a male bayonet 66, which is provided with means 68 in the form of a screw for tightening adjacent portions of the bayonet so as to precisely position and retain the lens holder 64 in relation to the bayonet 66, all in a manner similar to that shown in FIG. 2. In similar manner as described above, the lens is set for proper focus relative to a microimage plane 69 above the lens assembly 62 and, when the critical focus is established and set, the focus condition will remain until the lens is removed from the holder 64. The bayonet 66 also has three equally-spaced lugs or tabs 70 extending outwardly to engage with corresponding lugs or tabs 72 of a lens clamping ring or spring 74 of the shape as seen in FIG. 5. The spring 74 is supported against and along with a lens mounting ring 76 to the underside of a supporting plate 78 by means of screws 80. The plate 78 has an aperture 82 for passage of projected light therethrough to the plane 69 and a larger aperture 84 for seating of a beveled portion 86 of the bayonet 66. A stop pin 88 is also provided at one edge of one of the tabs 72 of the mounting ring 74 (FIG. 5).

In the preferred embodiment of the present invention, shown in FIGS. 1, 2 and 3, the lugs or tabs 50 have a beveled entry angle of fifteen degrees and have a thickness of 0.095 inch for fitting in a recess or cavity of 0.085 inch formed by the lugs 54 of the female bayonet plate 30 and the resilient portion 56 of the spring 32. When the male bayonet 48 is turned to engage the tabs or lugs 50 thereof with the female bayonet plate 30, the interference fit of 0.010 inch requires the portion 56 of spring 32 to push or bias the lens assembly 18 in a downward direction. The spring 32 is calculated to provide a minimum of ten pounds of clamping force with the 0.010 inch interference fit. The resilient portion 56 adjacent the aperture 55 of the spring 32 is of at least sufficient distance from the aperture to cover the lugs 54 in overlapping manner. In other words, the resilient portion 56 extends at least from the aperture 55, which may be approximately the diameter of the interior edge of the lugs 54, to an imaginary circle, as shown by the phantom line on the clamping member 32 of FIG. 3, the imaginary circle being approximately the diameter 52 of the plate member 30. It is, of course, feasible and may be preferred that the clamping member be made entirely of resilient material of the same composition.

In similar manner, the interference fit of the tabs 70 on the male bayonet 66 in the modified form of the invention (FIGS. 4 and 5) enables the spring 74 to push or bias the lens assembly 62, but in an upwardly direction.

The bayonet-mounted lens holder is a precision device in that controlled spring pressure maintains the lens assembly against a reference surface for repeatable positioning of the lens assembly in precise manner. When the lens assembly is mounted against the reference plate and a set of different magnification ratio lenses are properly focused, the lenses of the set can be exchanged or replaced in a few seconds by reason of the quick change lens mounting assembly.

In operation, it is thus seen that in the preferred structure when one lens is to be changed or replaced, for example, for another lens of a different magnification, the lens assembly 18 is positioned within the apparatus utilizing such lens assembly, as seen in FIG. 1, and upon moving the lugs 50 of the bayonet 48 up into the plane of the recess 57 between the lugs 54 of the bayonet plate 30 and the resilient portion 56 of the clamping spring 32, the lens assembly 18 is rotated by hand about 35 degrees to engage the respective lugs and to seat one lug 50 against the stop pin 60 and thereby precisely position the lens in relation to the plane 47. When so positioning the lens assembly 18, the clamping spring 32 biases or urges the bayonet 48 in a downwardly direction to firmly press the lugs 50 against the lugs 54 of the plate 30.

In similar manner in the modified structure, when one lens is to be changed for another lens, the lens assembly 62 is positioned within the apparatus and upon moving the lugs 70 of the bayonet 66 up into the plane of the recess between the lower surface of the supporting plate 78 and the resilient portions 72 of the lens clamping spring 74, the lens assembly 62 is rotated by hand about 35 degrees to engage the respective lugs and to seat one lug 70 against the stop pin 88 and thereby precisely position the lens in relation to the plane 69. When so positioning the lens assembly 62, the lens clamping spring 74 biases or urges the bayonet 66 in an upwardly direction to firmly press the lugs 70 against the lower surface of the plate 78.

Additionally, while the bayonet 48 of the lens assembly 18 has lugs 50 attached thereto for cooperating with the lugs 54 of member 30 and the resilient portion 56 of clamping spring 32, such lugs 50 may be a part of a portion attached to an apertured support member and the member 30 may be a part of the bayonet 48 and cooperable with the clamping ring 32. In this manner a plate member and a planar spring having cooperating portions thereon similar to lugs 54 of member 30 and the resilient portion 56 of spring 32 could be secured to the lens carrying member and the support member could carry lugs similar to lugs 50 for the purpose of precisely positioning the lens carrying member. The support member could have the lugs downwardly positioned and extending outwardly in a plane perpendicular from the axis of the aperture in the support member and when the lens assembly with the plate member and the planar spring attached thereto are positioned to receive the lugs of the support member, the spring would bias or urge the lugs of the support member in the space between the resilient portion of the spring and the lugs of the plate member. It should be noted that both the spring and the plate member would require access portions on the interior diameters to allow passage of the outwardly extending lugs of the support member and then include inwardly extending tabs, similar to tabs 54 shown in FIG. 3, to provide the seat therebetween for the lugs of the support member.

A further modification of the clamping or resilient member may include a larger internal diameter than is shown in FIG. 3 and having a plurality of resilient portions angularly corresponding with the lugs 54 of the bayonet plate 30 to thereby enable passage of the member 48 with lugs 50 through the apertures and to place the lugs 50 between the resilient portions of the clamping member and the lugs 54. In the practice of such modification, the lugs 50 may require a beveled portion on each end thereof to properly engage in the space between the portions of the clamping spring and the tabs of the bayonet plate member. Additionally, the resilient portions may be separated only by a kerf provided to form a plurality of resilient portions at least in sufficient diametral distance to cover the lugs of the member 50 and the tabs of the plate member 30.

It is thus seen that herein shown and described is a mounting for permitting rapid changing of a lens assembly wherein the lens-holding male bayonet engages with a female bayonet plate and is biased in position by a one piece spring which provides a force to insure that the lens assembly is always maintained in precise position after repeated positioning thereof. The lens mounting enables the accomplishment of the objects and advantages mentioned above, and while a preferred embodiment of the invention and a modification thereto have been disclosed herein, other variations may occur to those skilled in the art. It is contemplated that all such variations and modifications not departing from the spirit and scope of the invention hereof are to be construed in accordance with the following claims.

What is claimed is:

1. A lens mounting for enabling rapid changing of lenses comprising a
    support plate, a
    female plate member carried by said support plate, said female plate member having a plurality of equally spaced lugs positioned to provide a recess from one surface of said plate member and extending inwardly from an interior aperture thereof, a
    single piece planar clamping member abutting said female plate member and having an annular resilient interior portion thereof extending from an interior aperture outwardly at least to the diameter of the aperture of said plate member and substantially overlapping and spaced from said lugs,
    means securing said clamping member and said female plate member to said support plate, and a
    lens carrying member comprising a lens holder and a male barrel member carrying said lens holder and having a plurality of outwardly extending lugs thereon engageable in said recess with said lugs of said female plate member and with said resilient portion of said clamping member for securing said lens carrying member in axial position upon rotation of said lens carrying member a predetermined angular distance.

2. The lens mounting of claim 1 including stop means on at least one of said female plate member lugs for engagement by said lens carrying member upon rotation thereof.

3. The lens mounting of claim 1 including securing means for retaining said lens holder in precise axial position in relation to said barrel member.

4. A lens mounting for enabling rapid changing of lenses comprising a
- support plate, a
- first plate member carried by said support plate and having a plurality of equally spaced lugs extending inwardly from an aperture of said plate member and positioned to provide a recess from one surface of said plate member, a
- single piece planar clamping spring abutting said first plate member and having an annular resilient interior portion thereof extending from an aperture outwardly to a diameter overlapping said lugs and spaced therefrom,
- means securing said clamping spring and said first plate member to said support plate, and a
- second member comprising a lens holder and a male barrel member carrying said lens holder and having a plurality of lugs thereon engageable in said recess with the lugs of said first plate member and with the resilient portion of said clamping spring for securing said second member in axial position upon rotation of said second member a predetermined angular distance.

* * * * *